United States Patent
Altheimer et al.

(10) Patent No.: US 11,014,063 B2
(45) Date of Patent: May 25, 2021

(54) DEVICE FOR PROCESSING AND CONDITIONING OF MATERIAL TRANSPORTED THROUGH THE DEVICE

(71) Applicant: DSM IP ASSETS B.V., Heerlen (NL)

(72) Inventors: Marco Altheimer, Kaiseraugst (CH); Werner Bonrath, Kaiseraugst (CH); Roman Goy, Kaiseraugst (CH); Jonathan Alan Medlock, Kaiseraugst (CH); Sergio Vernuccio, Kaiseraugst (CH); Philipp Rudolf Von Rohr, Kaiseraugst (CH)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 16/609,606

(22) PCT Filed: May 1, 2018

(86) PCT No.: PCT/EP2018/061069
§ 371 (c)(1),
(2) Date: Oct. 30, 2019

(87) PCT Pub. No.: WO2018/202640
PCT Pub. Date: Nov. 8, 2018

(65) Prior Publication Data
US 2020/0061573 A1    Feb. 27, 2020

(30) Foreign Application Priority Data

May 1, 2017    (EP) ..................................... 17168885

(51) Int. Cl.
B01J 19/24    (2006.01)
B01D 46/24    (2006.01)
(Continued)

(52) U.S. Cl.
CPC ........ *B01J 19/248* (2013.01); *B01D 46/2451* (2013.01); *B01J 19/0053* (2013.01); *B01J 19/242* (2013.01); *B01D 2046/2477* (2013.01); *B01J 2219/32279* (2013.01); *B32B 3/00* (2013.01); *F01N 3/2821* (2013.01); *F01N 13/0097* (2014.06)

(58) Field of Classification Search
CPC ... Y10T 428/18; B01J 19/242; B01J 19/2485; B01J 35/04; B01J 2219/3322; B01J 2219/32466; F01N 13/0097; F01N 3/2821; F01N 3/28
See application file for complete search history.

(56) References Cited

U.S. PATENT DOCUMENTS

2002/0076372 A1* 6/2002 Leloup ................ F01N 13/0097
422/222
2002/0141921 A1 10/2002 Wu et al.
2009/0041635 A1 2/2009 Berkey et al.

FOREIGN PATENT DOCUMENTS

EP    1 216 751    6/2002

OTHER PUBLICATIONS

International Search Report for PCT/EP2018/061069, dated Jul. 11, 2018, 3 pages.
(Continued)

*Primary Examiner* — Alexander S Thomas
(74) *Attorney, Agent, or Firm* — Nixon & Vanderhye P.C.

(57) ABSTRACT

The present invention relates to a device for treatment of material transported through the device having a specific design.

13 Claims, 2 Drawing Sheets

Left) View of triangular structure and pipe.
Right) Hexagonal unit cell of the triangular structure.

(51) Int. Cl.
*B01J 19/00* (2006.01)
*B32B 3/00* (2006.01)
*F01N 13/00* (2010.01)
*F01N 3/28* (2006.01)

(56) References Cited

OTHER PUBLICATIONS

Written Opinion of the ISA for PCT/EP2018/061069, dated Jul. 11, 2018, 6 pages.

* cited by examiner

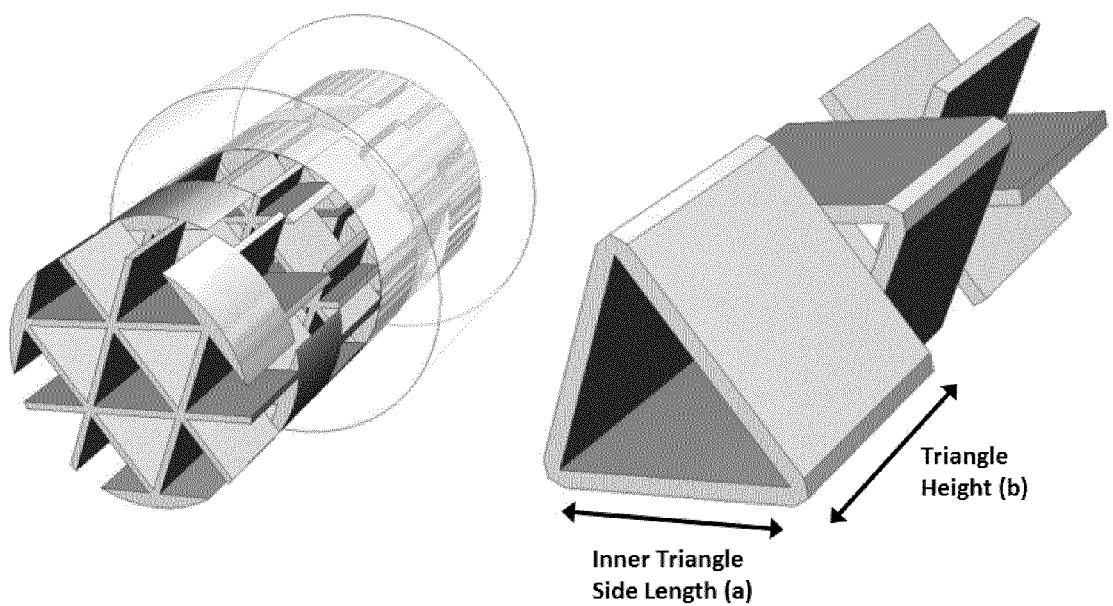
Figure 1: Left) View of triangular structure and pipe.
Right) Hexagonal unit cell of the triangular structure.
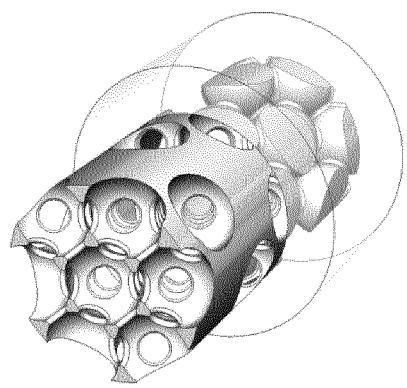
Figure 2: View of structured reactor of the prior art (for comparison)

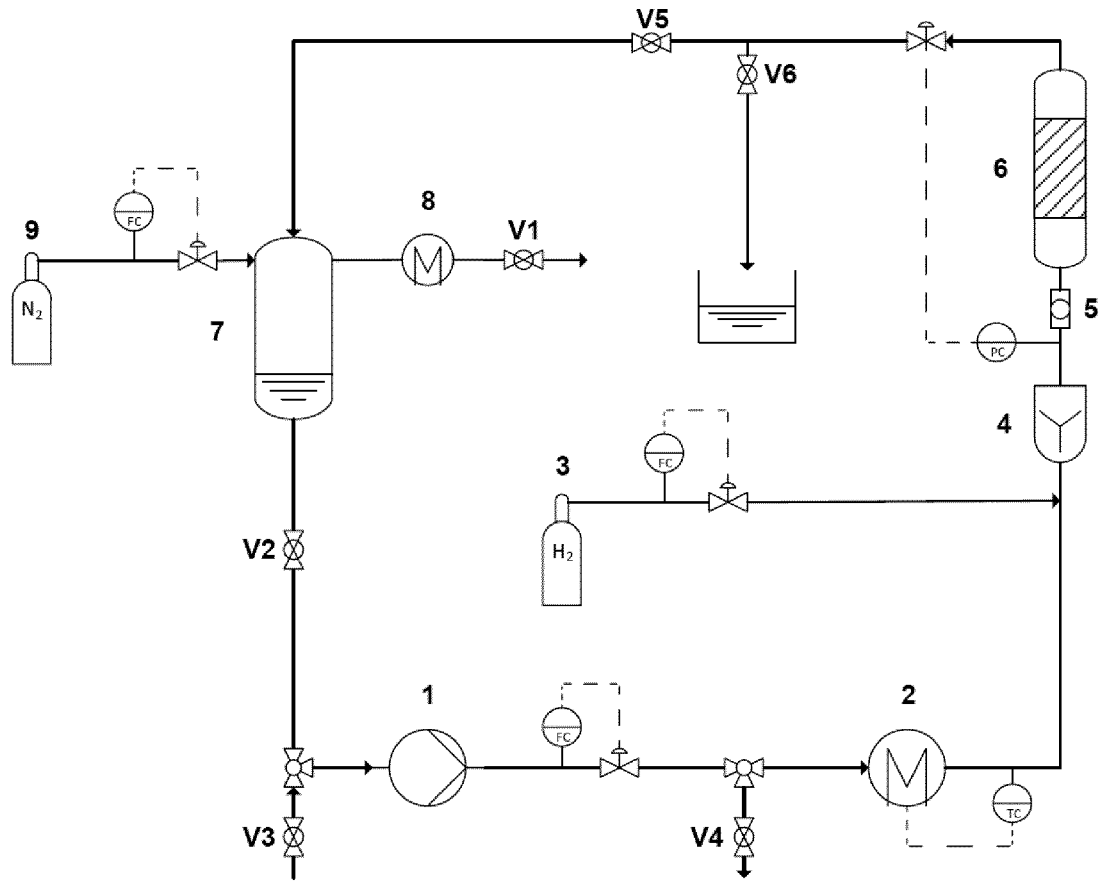
Figure 3.: Simplified scheme of the experimental setup. (1) pump, (2) electrical heater, (3) hydrogen tank, (4) static mixer, (5) view cell, (6) structured reactor (7) gas-liquid separator, (8) off – gas cooler, (9) nitrogen tank.

DEVICE FOR PROCESSING AND CONDITIONING OF MATERIAL TRANSPORTED THROUGH THE DEVICE

This application is the U.S. national phase of International Application No. PCT/EP2018/061069 filed 1 May 2018, which designated the U.S. and claims priority to EP Patent Application No. 17168885.6 filed 1 May 2017, the entire contents of each of which are hereby incorporated by reference.

The present invention relates to a device for treatment of material transported through the device having a specific design.

A device (=reactor tube) in accordance with the invention is useful as a mixer or heat exchanger for fluid or fluidized material transported through the device. The device is also useful to carry out chemical reactions under homogenous and heterogeneous conditions.

Selective hydrogenations of alkynes are important reactions for the production of fine chemicals (such as vitamins, aroma compounds, etc). Nowadays, these hydrogenations are often carried out in discontinuously operated slurry reactors. The handling of the catalyst and its separation after the reaction can strongly limit the efficiency of the process. Furthermore, discontinuous production in stirred vessels is affected by dead times, safety problems and low surface to volume ratios. To overcome these drawbacks, structured tubular reactors for multiphase catalytic hydrogenations are potential solutions. They combine good mixing, a high gas dispersion and a low pressure drop with the advantage of a regularly shaped geometry with increased surface area for catalyst support and heat exchange.

The new device (reactor tube) has a very special arrangement inside the tube. This allows the improved reaction conditions.

The reactor tube has an inlet end and an outlet end for treating a fluid flowing through the reactor tube, with a plurality of grid structures arranged in series in the flow direction in the reactor tube for mixing the fluid, wherein each grid structure consists of three sets of parallel partitions which bound flow channels with a flow cross section in the form of a (regular) polygon, and wherein the sets of partitions of adjacent grid structures are offset and/or rotated with respect to one another.

Therefore the present invention relates to a reactor tube (RT) having an inlet end and an outlet end for treating a fluid flowing through the reactor tube, with a plurality of grid structures arranged in series in the flow direction in the reactor tube for mixing the fluid, wherein each grid structure consists of three sets of parallel partitions which bound flow channels with a flow cross section in the form of a (regular) polygon, and wherein the sets of partitions of adjacent grid structures are offset and/or rotated with respect to one another.

The figures, which are a part of this patent application show the reactor tube according to the present invention.

The device according to the present invention can be produced using well-known technologies. It can be produced for example by Selective Laser Sintering (SLS) a method described for example in U.S. Pat. Nos. 5,639,070, 5,732,323 and 6,676,892 or by Electron Beam Melting (EBM).

Computer-aided design (CAD) is also used.

Furthermore, the printed structure (which is preferably metal) allows significantly better heat conduction and also gives the possibility to print a combined reactor-heat exchanger unit. The structure can be created in "one piece" by printing, rather than having multiple sections that need to be fixed together (possibilities of leaks and pressure drops).

Materials which can be used by this method in accordance with the present invention are steels (such as for example stainless steel (e.g. 17-4 or EOS StainlessSteel GP1)) or maraging steel (such as EOS MaragingSteel MS1), Titanium Ti6Al4V, Titanium Ti6Al4V ELI, Titanium Grade 2, Cobalt-Chrome (such as for example CoCr MP1), ASTM F75. Additional materials which can be used according to the present invention by EBM method are Titanium aluminide, Inconel (625 & 718), Stainless steel (e.g. 17-4), Tool steel (e.g. H13), Aluminium (e.g. 6061), Hard metals (e.g. NiWC), Copper (e.g. GRCop-84), Beryllium (e.g. AlBeMet), Amorphous metals, Niobium.

Therefore, the present invention relates to a reactor tube (RT'), which is reactor tube (RT), wherein the reactor tube is made from steel (such as stainless steel (e.g. 17-4) or EOS StainlessSteel GP1) or maraging steel (such as EOS MaragingSteel MS1)), Titanium Ti6Al4V, Titanium Ti6Al4V ELI, Titanium Grade 2, Cobalt-Chrome (such as for example CoCr MP1), ASTM F75, Titanium aluminide, Inconel (625 & 718), Tool steel (e.g. H13), Aluminium (e.g. 6061), Hard metals (e.g. NiWC), Copper (e.g. GRCop-84), Beryllium (e.g. AlBeMet), Amorphous metals or Niobium.

The triangular structure of the device (reactor tube) has an increased surface area (larger catalytic surface), improved dispersion qualities and reduced pressure drop. It has a geometry with a low area to circumference ratio (volume to surface) and furthermore, the change in the open cross-sectional area in axial direction is reduced to minimize fluid acceleration and deceleration, hence reduce pressure drop.

Triangular channels are extended in axial direction similar to a monolith reactor (see FIG. 1). Unlike monolith reactors with traversing channels, the triangular structure is made of radially translated layers of triangular channels. This arrangement allows radial mixing and break-up of bubbles in between the layers, while keeping the open cross-sectional area constant.

In a preferred embodiment, the layer and inner triangle side length are equally long and a total of 3 layers (A-B-C-layering) form one periodic unit, after which the layering is repeated (see FIG. 1).

In a preferred embodiment, each set of parallel partitions of the reactor tube, the adjacent partitions are equally spaced.

Therefore, the present invention relates to a reactor tube (RT1), which is reactor tube (RT) or (RT'), wherein each set of parallel partitions, the adjacent partitions are equally spaced.

In a preferred embodiment, the three sets of parallel partitions of the reactor tube according to the present invention intersect in each case at an angle of 120 degrees, and in that the partitions bound flow channels with a flow cross section in the form of an equilateral triangle.

Therefore, the present invention relates to a reactor tube (RT2), which is reactor tube (RT), (RT') or (RT1), wherein the three sets of parallel partitions intersect in each case at an angle of 120 degrees, and in that the partitions bound flow channels with a flow cross section in the form of an equilateral triangle.

In a preferred embodiment, the length of the grid structures of the reactor tube according to the present invention in the flow direction approximately corresponds to the side length of the equilateral triangles.

Therefore, the present invention relates to a reactor tube (RT3), which is reactor tube (RT), (RT'), (RT1) or (RT2), wherein the length of the grid structures in the flow direction approximately corresponds to the side length of the equilateral triangles.

In a preferred embodiment, the sets of partitions of adjacent grid structures the length of the grid structures of the reactor tube according to the present invention are offset with respect to one another in a direction perpendicular to the plane of one of the partitions.

Therefore, the present invention relates to a reactor tube (RT4), which is reactor tube (RT), (RT'), (RT1), (RT2) or (RT3), wherein the sets of partitions of adjacent grid structures are offset with respect to one another in a direction perpendicular to the plane of one of the partitions.

In a preferred embodiment, the sets of partitions of adjacent grid structures of the reactor tube according to the present invention are rotated with respect to one another by an angle of 60 degrees.

Therefore, the present invention relates to a reactor tube (RT5), which is reactor tube (RT), (RT'), (RT1), (RT2), (RT3) or (RT4), wherein the sets of partitions of adjacent grid structures are rotated with respect to one another by an angle of 60 degrees.

In a preferred embodiment, the orientation of the grid structures of the reactor tube according to the present invention repeats periodically.

Therefore, the present invention relates to a reactor tube (RT6), which is reactor tube (RT), (RT'), (RT1), (RT2), (RT3), (RT4) or (RT5), wherein the orientation of the grid structures repeats periodically.

In a preferred embodiment, the orientation of the grid structures of the reactor tube according to the present invention repeats in each case after three grid structures.

Therefore, the present invention relates to a reactor tube (RT7), which is reactor tube (RT), (RT'), (RT1), (RT2), (RT3), (RT4), (RT5) or (RT6), wherein the orientation of the grid structures repeats, in each case after three grid structures.

In a preferred embodiment, the orientation of the grid structures of the reactor tube according to the present invention repeats are extruded parts.

Therefore, the present invention relates to a reactor tube (RT8), which is reactor tube (RT), (RT'), (RT1), (RT2), (RT3), (RT4), (RT5), (RT6) or (RT7), wherein the grid structures are extruded parts.

In a preferred embodiment, in two out of three grid structures arranged in series, a central axis of the reactor tube runs through the middle of one of the polygons, and in the third grid structure it runs through a partition.

Therefore, the present invention relates to a reactor tube (RT9), which is reactor tube (RT), (RT'), (RT1), (RT2), (RT3), (RT4), (RT5), (RT6), (RT7) or (RT8), wherein two out of three grid structures arranged in series, a central axis of the reactor tube runs through the middle of one of the polygons, and in the third grid structure it runs through a partition.

The overall dimensions of the reactor tube according to the present invention can vary. This is also an advantage of the device that it can be adopted easily to requirements as needs of an intended use.

Suitable (and also preferred) dimensions of the reactor tube are the following: The inner pipe diameter of the reactor tube is from 1-100 mm (preferably 10-50 mm, more preferred 10-30 mm).

Therefore, the present invention relates to a reactor tube (RT10), which is reactor tube (RT), (RT'), (RT1), (RT2), (RT3), (RT4), (RT5), (RT6), (RT7), (RT8) or (RT9), wherein the inner pipe diameter of the tube reactor is from 1-100 mm (preferably 10-50 mm, more preferred 10-30 mm).

The total length of the reactor tube is from 100-2000 mm (preferably 100-1000 mm, more preferred 100-500 mm).

Therefore, the present invention relates to a reactor tube (RT11), which is reactor tube (RT), (RT'), (RT1), (RT2), (RT3), (RT4), (RT5), (RT6), (RT7), (RT8), (RT9) or (RT10), wherein the total length of the reactor tube is from 100-2000 mm (preferably 100-1000 mm, more preferred 100-500 mm).

The inner triangle side length of the reactor tube (marked as a in FIG. 1) is from 1-10 mm, (preferably 1-5 mm, more preferred 2-3 mm).

Therefore, the present invention relates to a reactor tube (RT12), which is reactor tube (RT), (RT'), (RT1), (RT2), (RT3), (RT4), (RT5), (RT6), (RT7), (RT8), (RT9), (RT10) or (RT11), wherein the inner triangle side length of the reactor tube is from 1-10 mm, (preferably 1-5 mm, more preferred 2-3 mm).

The triangle height of the reactor tube (marked as b in FIG. 1) is from 1-10 mm, (preferably 1-5 mm, more preferred 2-3 mm).

Therefore, the present invention relates to a reactor tube (RT13), which is reactor tube (RT), (RT'), (RT1), (RT2), (RT3), (RT4), (RT5), (RT6), (RT7), (RT8), (RT9), (RT10), (RT11) or (RT12), wherein the triangle height of the reactor tube is from 1-10 mm, (preferably 1-5 mm, more preferred 2-3 mm).

The periodic unit length of the reactor tube is 3-30 mm (preferably 6-20 mm, more preferred 6-9 mm). The preferred periodic unit length is 3 times the triangle height.

Therefore, the present invention relates to a reactor tube (RT14), which is reactor tube (RT), (RT'), (RT1), (RT2), (RT3), (RT4), (RT5), (RT6), (RT7), (RT8), (RT9), (RT10), (RT11), (RT12) or (RT13), wherein the periodic unit length of the reactor tube is 3-30 mm (preferably 6-20 mm, more preferred 6-9 mm).

The porosity of the reactor tube is 65-85% (preferably 70-80%, more preferred 72-78%).

Therefore, the present invention relates to a reactor tube (RT15), which is reactor tube (RT), (RT'), (RT1), (RT2), (RT3), (RT4), (RT5), (RT6), (RT7), (RT8), (RT9), (RT10), (RT11), (RT12), (RT13) or (RT14), wherein the porosity of the reactor tube is 65-85% (preferably 70-80%, more preferred 72-78%).

The reactor tube can be produced in one piece. Many of the prior art reactor tubes are multiple section type of reactor tubes (that means that one identical part is put together a few times). The reactor tube can for example be produced by printing methods. Any other methods known in the prior art can be also used to produce the reactor tube.

Therefore the present invention also relates to a method of producing any of the reactor tubes (RT), (RT'), (RT1), (RT2), (RT3), (RT4), (RT5), (RT6), (RT7), (RT8), (RT9), (RT10), (RT11), (RT12), (RT13), (RT14) or (RT15), where the reactor is produced in one piece (for example by printing).

Furthermore, the grid structures inside the reactor tube according to the present invention can be coated with an oxide primer layer and a catalyst layer.

Therefore, the present invention relates to a reactor tube (RT16), which is reactor tube (RT), (RT'), (RT1), (RT2), (RT3), (RT4), (RT5), (RT6), (RT7), (RT8), (RT9), (RT10), (RT11), (RT12), (RT13), (RT14) or (RT15), wherein the grid structures inside the reactor tube are coated with an oxide primer layer and a catalyst layer.

Due to this coating the reactor tube shows improved catalytic properties for specific chemical reactions (especially hydrogenation processes).

The oxide primer layer which coats the grid structure is non-acidic (preferably basic or amphoteric). Suitable non-acidic metal oxide layers comprise ZnO, $CeO_2$, $Cr_2O_3$, MnO, MgO, CuO or $Al_2O_3$.

Preferably the oxide primer layer comprises ZnO and optionally at least one further metal oxide wherein the metal is chosen from the group consisting of Cr, Ce, Mn, Mg, Cu and Al.

Therefore, the present invention relates to a reactor tube (RT17), which is reactor tube (RT16), wherein the oxide primer layer is non-acidic (preferably basic or amphoteric).

Therefore, the present invention relates to a reactor tube (RT18), which is reactor tube (RT16) or (RT17), wherein the oxide primer layer comprises ZnO, $CeO_2$, $Cr_2O_3$, MnO, MgO, CuO or $Al_2O_3$.

Therefore, the present invention relates to a reactor tube (RT19), which is reactor tube (RT16), (RT17) or (RT18), wherein the oxide primer layer comprises ZnO and optionally at least one further metal oxide wherein the metal is chosen from the group consisting of Cr, Ce, Mn, Mg, Zn, Cu and Al (preferred Cr, Ce, Mn, Zn, Cu and Al).

The coating of the metal alloy of the reactor tube is done by commonly known processes, such as i.e. dip-coating.

Usually the reactor tube of the present invention comprises between 0.001 and 3.0 wt-%, based on the total weight of the reactor tube, of ZnO, preferably between 0.01 and 2.5 wt-%, more preferably 0.1-2.0 wt-%).

Therefore, the present invention relates to a reactor tube (RT20), which is reactor tube (RT16), (RT17), (RT18) or (RT19), wherein the reactor tube of the present invention comprises between 0.001 and 3.0 wt-%, based on the total weight of the reactor tube, of ZnO, preferably between 0.01 and 2.5 wt-%, more preferably 0.1-2.0 wt-%.

In a preferred embodiment of the present invention the non-acidic metal oxide layers comprises ZnO and at least one further metal oxide wherein the metal is chosen from the group consisting of Cr, Ce, Mn, Mg, Zn, Cu and Al (preferred Cr, Ce, Mn, Zn, Cu and Al).

In a more preferred embodiment of the present the non-acidic metal oxide layer comprises ZnO and $Al_2O_3$.

When a mixture of ZnO and $Al_2O_3$ is used then it is preferred that the (molar) ratio of ZnO:$Al_2O_3$ is from 2:1 to 1:2.

Therefore, the present invention relates to a reactor tube (RT21), which is reactor tube (RT16), (RT17), (RT18), (RT19) or (RT20), wherein the non-acidic metal oxide layer comprises ZnO and $Al_2O_3$.

Therefore, the present invention relates to a reactor tube (RT21'), which is reactor tube (RT21), wherein the ratio of ZnO:$Al_2O_3$ is from 2:1 to 1:2.

Also preferably the oxide primer layer comprises $CeO_2$ and optionally at least one further metal oxide wherein the metal is chosen from the group consisting of Zn, Cr, Mn, Mg, Cu and Al.

Usually the tube reactor of the present invention comprises between 0.001 and 3.0 wt-%, based on the total weight of the reactor tube, of $CeO_2$, preferably between 0.01 and 2.5 wt-%, more preferably 0.1-2.0 wt-%).

Therefore, the present invention relates to a reactor tube (RT22), which is reactor tube (RT16), (RT17) or (RT18), wherein the oxide primer layer comprises $CeO_2$ and optionally at least one further metal oxide wherein the metal is chosen from the group consisting of Zn, Cr, Mn, Mg, Cu and Al.

Therefore, the present invention relates to a reactor tube (RT23), which is reactor tube (RT22), wherein the tube reactor comprises between 0.001 and 3.0 wt-%, based on the total weight of the reactor tube, of $CeO_2$, preferably between 0.01 and 2.5 wt-%, more preferably 0.1-2.0 wt-%.

In a preferred embodiment of the present invention the non-acidic metal oxide primer layers comprises $CeO_2$ and at least one further metal oxide wherein the metal is chosen from the group consisting of Zn, Cr, Ce, Mn, Mg, Cu and Al.

In a more preferred embodiment of the present the non-acidic metal oxide primer layer comprises $CeO_2$ and $Al_2O_3$.

When a mixture of $CeO_2$ and $Al_2O_3$ is used then it is preferred that the (molar) ratio of $CeO_2$:$Al_2O_3$ is from 2:1 to 1:2.

Therefore, the present invention relates to a reactor tube (RT24), which is reactor tube (RT22) or (RT23), wherein the reactor tube comprises between 0.001 and 3 wt-%, based on the total weight of the reactor tube, of $CeO_2$ and at least one further metal oxide wherein the metal is chosen from the group consisting of Zn, Cr, Ce, Mn, Mg, Cu and Al, preferably between 0.01 and 2.5 wt-%, more preferably 0.1-2.0 wt-%.

Therefore, the present invention relates to a reactor tube (RT25), which is reactor tube (RT22), (RT23) or (RT24), wherein the non-acidic metal oxide primer layer comprises $CeO_2$ and $Al_2O_3$.

Therefore, the present invention relates to a reactor tube (RT25'), which is reactor tube (RT25), wherein the (molar) ratio of $CeO_2$:$Al_2O_3$ is from 2:1 to 1:2.

In another more preferred embodiment of the present the non-acidic metal oxide primer layer comprises $CeO_2$ and ZnO.

When a mixture of $CeO_2$ and ZnO is used then it is preferred that the ratio of $CeO_2$:ZnO is from 2:1 to 1:2.

Therefore, the present invention relates to a reactor tube (RT26), which is reactor tube (RT22), (RT23) or (RT24), wherein the non-acidic metal oxide primer layer comprises $CeO_2$ and $Al_2O_3$.

Therefore, the present invention relates to a reactor tube (RT26'), which is reactor tube (RT26), wherein the ratio of $CeO_2$:ZnO is from 2:1 to 1:2.

The so coated element or elements are then impregnated by Pd-nanoparticles. The nanoparticles are synthesized by commonly known methods, i.e. by using $PdCl_2$ as a precursor, which is then reduced by hydrogen.

It is also possible to use a process, wherein metal alloys are impregnated by the Pd-nanoparticles by a process, which comprises a sonication step. The sonication is the act of applying sound energy to agitate particles in a sample. Ultrasonic frequencies (>20 kHz) are usually used, leading to the process also being known as ultrasonication or ultrasonication.

It is usually applied using an ultrasonic bath or an ultrasonic probe.

Such a process comprises usually (and preferably) the following steps:

(a) preparing an aqueous solution of Pd-salt optionally adding a polyethylene glycol (b) heating the solution of step (a) and subjecting the solution to sonication (c) adding a reducing agent, preferably a solution of formate, to the Pd solution (d) adding the metal oxide powder (e) the suspension which is obtained in step (d) is filtrated and dried In the following the steps of the process wherein a sonication step is involved is discussed in more details below:

Step (a)

The Pd salt is dissolved in water (or aqueous solvent, which means that water is mixed at least one other solvent).

Any commonly known and used Pd-salt can be used. Suitable salts are $PdCl_2$ or $Na_2PdCl_4$. It can be one Pd-salt as well as a mixture of two or more Pd-salts. Furthermore, it is of an advantage to add at least one surfactant to the solution. Suitable are i.e. polyethylene glycol (PEG), polyvinylpyrrolidones (PVP) or glucosamides.

Step (b)

The solution of step is usually heated up to elevated temperature. Usually not to a higher temperature as the boiling point of the solvent (or solvent mixture used). Usually it is heated up to a temperature of between 30-80° C.

The sonication is usually carried out at a frequency of 30-50 kHz.

The duration of the sonication step is usually at least 10 minutes, preferred more than 20 (suitable and preferred range is 30-120 minutes). The maximal length of the duration of the sonication step is not critical.

The sonication step can be carried out by using an ultrasonic bath or an immersion probe. Or even a combination of both methods is possible.

Step (c)

To the solution of step (b) a reducing agent is added. Usually it is a sodium formate solution. But also, other formate salts (or mixtures of formate salts) could be used. Optionally (instead of or additionally), it is also possible to add H2-gas, L-ascorbic acid, and/or formic acid.

Step (d)

To the solution of step (c) the metal oxide powder (or a mixture of metal oxide powders) are added. Usually the reaction mixture is stirred.

Step (e)

Finally, the suspension of step (d) is filtered and the obtained doped metal oxide powder is usually washed and dried.

Therefore, the present invention relates to a reactor tube (RT27), which is reactor tube (RT16), (RT17), (RT18), (RT19), (RT20), (RT21), (RT21'), (RT22), (RT23), (RT24), (RT25), (RT25'), (RT26) or (RT26'), wherein the non-acidic metal oxide primer layer is impregnated by Pd-nanoparticles.

Usually the Pd-nanoparticles, which are on the non-acidic metal oxide primer layer, have an average particle size of between 0.5 and 20 nm, preferably of between 2 and 15 nm, more preferably of between 5 and 12 nm. (The average particle size can be measured by electron microscopy methods).

Therefore, the present invention relates to a reactor tube (RT28), which is reactor tube (RT27), wherein the Pd-nanoparticles have an average particle size of 0.5 and 20 nm, preferably of between 2 and 15 nm, more preferably of between 5 and 12 nm.

The reactor tube according to present invention comprises between 0.0001 and 1 wt-%, based on the total weight of the reactor tube, of the Pd-nanoparticles, preferably between 0.001 and 0.1 wt-%.

Therefore, the present invention relates to a reactor tube (RT29), which is reactor tube (RT27) or (RT28), wherein the reactor comprises between 0.0001 and 1 wt-%, based on the total weight of the reactor tube, of the Pd-nanoparticles, preferably between 0.001 and 0.1 wt-%.

In a preferred embodiment, the reactor tube is designed for the use as a mixer or heat exchanger or for the continuous handling of single and multiphase chemical reactions, as for example fast, exothermic, mixing sensitive or temperature sensitive reactions. The reactor tube provides a fast mixing of reactants and an extremely enhanced heat transfer. The specific design of the reactor is of major importance to guarantee a good heat transfer and very high mechanical stability. This enables the possibility to process up to high temperatures and pressures.

For conventional batch reactors, which are often used in chemical plants, the energy dissipation may be controlled by the rotational speed of the stirrer. For continuous systems only the flow rate can be changed which is directly linked to the residence time and its distribution. This correlation is a disadvantage compared to batch reactors, but can be handled by clearly defined geometry of the porous elements designed by the aid of Computational Fluid Dynamics (CFD) which are then manufactured, e.g. by the SLS method mentioned above.

In FIG. 3, a simplified scheme of the experimental setup is shown. It can be seen how the reactor tube according to the present invention can be used.

Hydrogenation of functional groups in organic molecules are examples of fast multiphase, exothermic reactions. Such reactions are part of environmentally acceptable reaction routes available for organic synthesis. For example, the precursors, i.e. intermediates for Vitamin A and Vitamin E are produced by three major types of reactions. One among them is catalytic selective hydrogenation, a multiphase, i.e. three-phase reaction, in which the reaction mixture comprises a liquid phase, a non-dissolved solid catalytic phase and a gaseous phase.

Especially, the coated and doped with Pd-nanoparticles reactor tube of the present invention is used in selective catalytic hydrogenation of organic starting material, especially of organic starting material comprising a carbon-carbon triple bond, more especially of alkynol compounds.

Therefore the present invention also relates to the use of the reactor tube (RT28), (RT29) or (RT30) in selective catalytic hydrogenation of organic starting material, especially of organic starting material comprising a carbon-carbon triple bond, more especially of alkynol compounds.

Therefore the present invention also relates to a process (P) of reacting a compound of formula (I)

$$HC\equiv C-\underset{R_1}{\overset{OR_3}{\underset{|}{\overset{|}{C}}}}-R_2, \qquad (I)$$

wherein $R_1$ is linear or branched $C_1$-$C_{35}$ alkyl or linear or branched $C_5$-$C_{35}$ alkenyl moiety, wherein the C chain can be substituted, and $R_2$ is linear or branched $C_1$-$C_4$ alkyl, wherein the C chain can be substituted, $R_3$ is H or —C(CO)$C_1$-$C_4$alkyl, using a reactor tube (RT28), (RT29) or (RT30).

Preferably the present invention relates to a process of reacting a compound of formula (I)

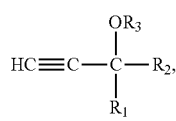

(I)

wherein $R_1$ is linear or branched $C_1$-$C_{35}$ alkyl or linear or branched $C_5$-$C_{35}$ alkenyl moiety, wherein the C chain can be substituted, and $R_2$ is linear or branched $C_1$-$C_4$ alkyl, wherein the C chain can be substituted, $R_3$ is H or —C(CO)$C_1$-$C_4$alkyl, using a reactor tube according to the present invention.

Therefore the present invention also relates to a process (P1) of reacting a compound of formula (I)

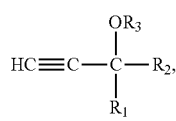

(I)

wherein $R_1$ is linear or branched $C_1$-$C_{35}$ alkyl or linear or branched $C_5$-$C_{35}$ alkenyl moiety, wherein the C chain can be substituted, and $R_2$ is linear or branched $C_1$-$C_4$ alkyl, wherein the C chain can be substituted, $R_3$ is H or —C(CO)$C_1$-$C_4$alkyl, using a reactor tube (RT28), (RT29) or (RT30).

Hydrogen is usually used in the form of H2 gas.

Therefore the present invention also relates to a process (P2), which is process (P) or (P1), wherein hydrogen is used in the form of H2 gas.

Preferred compounds of formula (I) are the following:

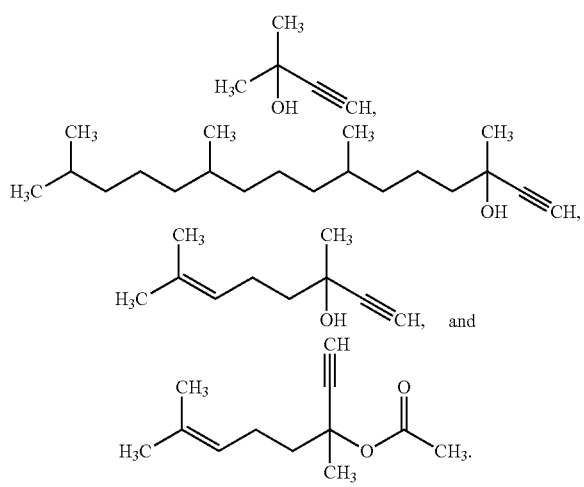

Therefore the present invention also relates to a process (P3), which is process (P), (P1) or (P2), wherein the following compounds

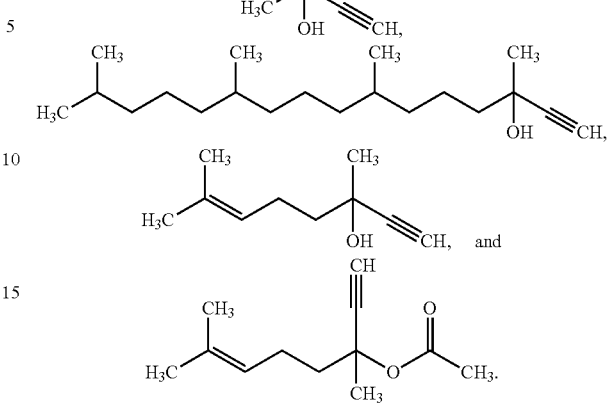

are hydrogenated selectively.

FIGURES

FIG. 1: Left) View of triangular structure and pipe.
Right) Hexagonal unit cell of the triangular structure.

FIG. 2: View of structured reactor of the prior art (for comparison)

FIG. 3: Simplified scheme of the experimental setup. (1) pump, (2) electrical heater, (3) hydrogen tank, (4) static mixer, (5) view cell, (6) structured reactor (7) gas-liquid separator, (8) off-gas cooler, (9) nitrogen tank.

The following examples serve to illustrate the invention. All percentages are related to weight and the temperatures are given in degree Celsius, if not otherwise stated.

EXAMPLES

Example 1 Manufacturing of a Reactor Tube

The described reactor (the exact dimensions are listed below) was prepared by Laser Sintering Technique. The reactor tune was produced out of EOS Maraging Steel MS1 ® (from EOS GmbH). With this technology, a three-dimensional structure of nearly every shape can be designed in a Computer Assisted Design (CAD) software and then manufactured as one single part. This is done by depositing a layer of metal powder, directing energy on a selected position corresponding to the CAD model to sinter it before depositing a new layer and begin the procedure again as it is for example described in U.S. Pat. Nos. 5,639,070, 5,732,323 and 6,676,892.

Dimensions of the reactor tube (with the triangular structure):

Inner pipe diameter: 14 mm
Total structure length: 202.86 mm (28 periodic units)
Inner triangle side length: 2.415 mm
Triangle height: 2.415 mm
Periodic unit length: 7.245 mm (3× triangle height)
Porosity: 76.6%

Preparation of Catalyst and Base-Layer Coated Structures

The triangular structure was subjected to a thermal pretreatment at 450° C. for 3 h. For preparation of the primer solution, Ce(NO$_3$)$_3$.6H$_2$O (508 mmol) and 700 mL water were added to a beaker. The mixture was stirred with a stirring bar until the salt was dissolved completely. The solution was heated up to 90° C. and the ZnO (508 mmol) was slowly added to the solution. The stirring was maintained at 90° C. and 65% nitric acid was added dropwise until all ZnO was completely dissolved (final $C_{HNO3}$=1 M). Afterwards the solution was cooled to room temperature and filtrated through a 0.45 μm membrane filter. The deposition of ZnO/CeO$_2$ was performed by rinsing the inside of the thermally pre-treated triangular structure with 50 mL of the primer solution. The structure was then dried at 60° C. at 125 mbar for 2 h followed by calcination at 450° C. for 1 h. This process was repeated 3 times. Sodium tetrachloropalladate (II) (0.32 mmol) was dissolved in 96 mL of Millipore water and PEG-MS40 (2 mmol) were added. The solution was heated up to 60° C. and sonication was started at this temperature. Afterwards a freshly prepared solution of sodium formate (16 mM, 48 mL) was added. The solution was sonicated for further 60 minutes at this temperature and then cooled to room temperature. The resulting solution was rinsed through the triangular structure in vertical position four times, until the solution was almost colorless. The structured reactor was then dried at 40° C. under reduced pressure for 2 h. The structure was subjected to a temperature treatment at 300° C. for 4 h (temperature ramp—10°/min) under H2-Ar flow (1:9; total flow rate—450 ml/min).

Selective Hydrogenation Reactions Using the Reactor Tube

The reactor tube, which was produced as describe above (Example 1) was used and the arrangement for the hydrogenation process can be seen in FIG. 3.

In the typical hydrogenation experiment the liquid phase (10 wt % 2-methyl-3-butyne-2-ol (MBY), 90 wt % 2-methyl-3-butene-2-ol (MBE)) is recirculated through the system at high velocity and heated up in order to reach the desired reaction temperature. The electrical heater consists in a block of brass equipped with two heating cartridges (400 W each). The temperature is controlled directed at the outlet of the heater by means of a PID temperature controller. A back-pressure regulator controls the pressure at the reactor inlet. After stabilization of pressure and temperature, the flowrate is regulated to the desired value and pure hydrogen is supplied from an external tank (flowrate=1 nL/min). As soon as hydrogen bubbles are visible in the view cell, valve V5 is closed and valve V6 is simultaneously opened (Scheme 3). Before entering the reactor, the gas and the liquid phase are pre-mixed in a static mixer (length=200 mm, diameter=14 mm, porosity=87%). The off-gas is separated from the liquid and cooled down with cooling water to condense eventual organic vapours. The triangular structure is thermally insulated to minimize heat losses. After each experiment the setup is emptied and flushed by nitrogen. Liquid samples are withdrawn at defined intervals of time through a manual valve and analysed using a GC-450 gas-chromatograph.

To show the improved properties of the new reactor tube, comparison test with a reactor tube from the prior art (WO2010/142806) were carried out. The reactor tube for the comparison test was produced in the same way and it was also coated the same way as the new reactor tube

TABLE 1

Reactions run in continuous mode (to evaluate activity); pressure was varied
Reaction conditions: gas flow rate: 1 nL/min, liquid flow rate: 10 kg/h, reaction temperature: 90° C.

| Exp. | Reactor Tube type | Pressure (bar) | Activity (mol/s mol Pd) |
|---|---|---|---|
| 1 | Structured (Comparison) | 3 | 0.6159 |
| 2 | Triangular (Invention) | 3 | 1.0812 |
| 3 | Structured (Comparison) | 5 | 0.8715 |
| 4 | Triangular (Invention) | 5 | 1.5164 |
| 5 | Structured (Comparison) | 7 | 1.0923 |
| 6 | Triangular (Invention) | 7 | 1.7406 |

It can be seen that the activity of the new reactor tube is improved significantly.

TABLE 2

Reactions run in continuous mode (to evaluate activity); reaction temperature was varied
Reaction conditions: gas flow rate: 1 nL/min, liquid flow rate: 10 kg/h, pressure 7 bar

| Exp. | Reactor Tube type | Temp (° C.) | Activity (mol/s mol Pd) |
|---|---|---|---|
| 7 | Structured (Comparison) | 90 | 1.0923 |
| 8 | Triangular (Invention) | 90 | 1.7406 |
| 9 | Structured (Comparison) | 80 | 0.9378 |
| 10 | Triangular (Invention) | 80 | 1.5314 |
| 11 | Structured (Comparison) | 70 | 0.7994 |
| 12 | Triangular (Invention) | 70 | 1.2648 |
| 13 | Structured (Comparison) | 60 | 0.6901 |
| 14 | Triangular (Invention) | 60 | 0.9687 |

It can be seen that the activity of the new reactor tube is improved significantly.

TABLE 3

Reactions run in semi-batch mode (to evaluate selectivity)
Reaction conditions: 80° C., 4 bar H$_2$, gas flow rate: 0.7 nL/min, liquid flow rate: 70 kg/h

| Exp. | Reactor Tube type | Conversion | Selectivity (MBE) | Time (min) |
|---|---|---|---|---|
| 15 | Structured (Comparison) | 99.8% | 89.3% | 421 |
| 16 | Triangular (Invention) | 99.9% | 90.7% | 390 |

It can be seen that the conversion and the selectivity are improved (at shorter reaction time).

The invention claimed is:

1. A reactor tube comprising:
an inlet end and an outlet end for treating a fluid flowing through the reactor tube between the inlet and outlet ends,
a plurality of grid structures arranged in series in a flow direction in the reactor tube for mixing the fluid flowing through the reactor tube between the inlet and outlet ends, wherein
each of the grid structures consists of three sets of parallel partitions which bound flow channels with a flow cross section in the form of a regular polygon, and wherein
the three sets of partitions of adjacent grid structures are rotated with respect to one another by an angle of 60 degrees with an orientation of the grid structures being repeated periodically.

2. The reactor tube according to claim 1, wherein adjacent partitions in each set of the parallel partitions are equally spaced.

3. The reactor tube according to claim 1, wherein the three sets of parallel partitions intersect at an angle of 120 degrees, and wherein the partitions bound flow channels with a flow cross section in the form of an equilateral triangle.

4. The reactor tube according to claim 3, wherein the length of the grid structures in the flow direction approximately corresponds to a side length of the equilateral triangles.

5. The reactor tube according to claim 3, wherein the equilateral triangle has a height from 1-10 mm.

6. The reactor tube according to claim 5, wherein the three sets of parallel partitions have a periodic unit length of 3-30 mm, and wherein the periodic unit length is 3 times the height of the equilateral triangle.

7. The reactor tube according to claim 1, wherein the three sets of partitions of adjacent grid structures are offset with respect to one another in a direction perpendicular to a plane of one of the partitions.

8. The reactor tube according to claim 1, wherein the orientation of the grid structures repeats after three grid structures.

9. The reactor tube according to claim 1, wherein two out of the three grid structures are arranged in series, and wherein a central axis of the reactor tube runs through an intersection line of the two partitions, and wherein an intersection line of a third grid structure it runs through the middle of one of the polygons.

10. The reactor tube according to claim 1, wherein the grid structures are coated with an oxide primer layer and a catalyst layer.

11. The reactor tube according to claim 10, wherein the primer layer is a mixed oxide comprising cerium oxide and zinc oxide.

12. The reactor tube according to claim 10, wherein the catalyst layer comprises palladium nanoparticles.

13. A hydrogenation reactor which comprises a plurality of the reactor tubes according to claim 1.

* * * * *